June 11, 1968   D. A. J. DAVIS   3,388,273

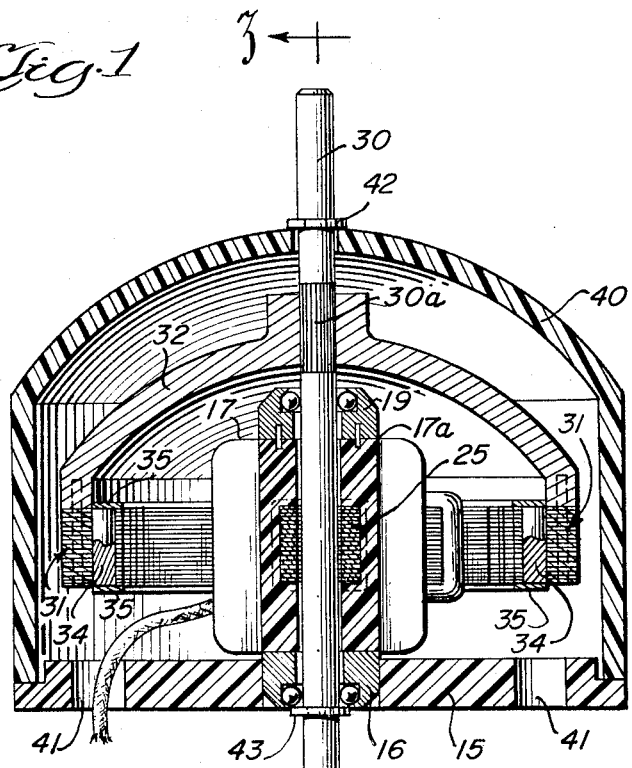
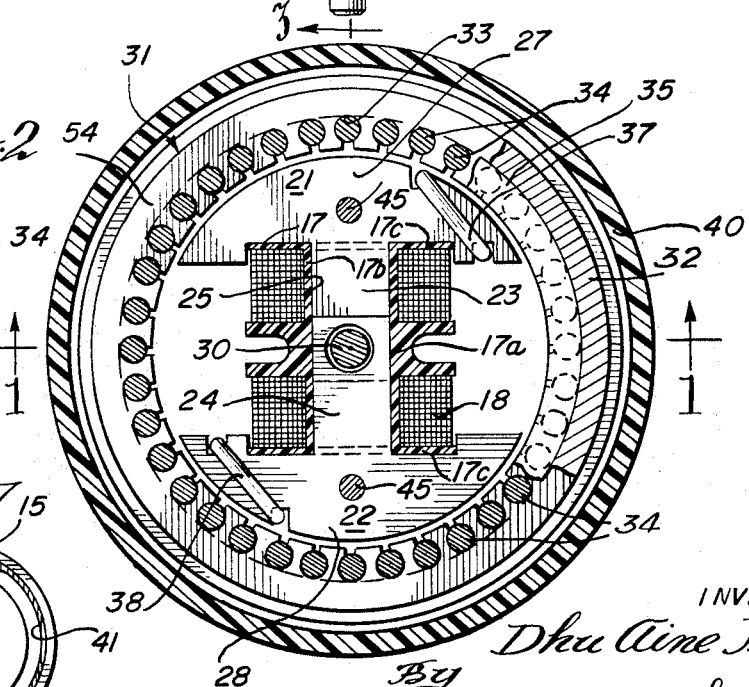
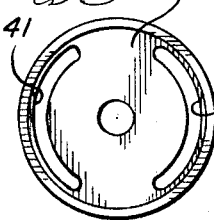

MOTOR

Filed Sept. 7, 1965   3 Sheets-Sheet 3

United States Patent Office 3,388,273
Patented June 11, 1968

3,388,273
MOTOR
Dhu Aine J. Davis, Wheaton, Ill., assignor to Hermetic Coil Co., Inc., a corporation of Connecticut
Filed Sept. 7, 1965, Ser. No. 485,368
3 Claims. (Cl. 310—67)

ABSTRACT OF THE DISCLOSURE

An AC machine has a basic stator construction useful for induction, synchronous or hysteresis motors. The rotor is a ring surrounding the stator and rotating about the periphery of arcuate stator pole pieces. The stator includes a bobbin having a rectangular opening therethrough, a coil wound thereon and a pair of opposed stator pole pieces each with a leg portion extending into the bobbin. The rotor shaft passes through a center web of the bobbin and is supported in bearings on either side thereof.

Specification

This invention relates to an electric motor and more specifically to a low cost, alternating current motor construction particularly adapted for fractional horsepower applications.

Fractional horsepower motors conventionally have a rather heavy construction with an outer frame which carries a stator core and pole pieces, stator windings thereon and bearings for the rotor shaft. The shaft in turn supports the rotor which has a heavy laminated core and windings thereon. Such a motor construction requires considerable labor in assembling the laminations and windings, with a resulting high production cost.

It is a principal object of this invention to provide an improved motor construction which results in reduced assembly costs.

Another object of the invention is to provide a basic stator construction which may be utilized with motors operating on the induction, synchronous or hysteresis principles.

One feature of the invention is the provision of a motor including a stator with a coil and a pair of pole pieces, one on either side of the coil and each having an arcuate peripheral surface, together with a rotor having a ring portion surrounding the pole pieces and mounted for rotation with respect thereto. More specifically, the stator includes a bobbin having a central opening therethrough with a coil wound on the bobbin and a pair of opposed stator pole pieces each having a leg portion extending into the bobbin opening and a pole portion with an arcuate peripheral surface, the pole portions forming opposed segments of a circle.

A further feature is that the stator pole pieces each comprise a stack of laminations with the ends of the leg portions interleaved within the bobbin.

Still another feature of the invention is that in a motor for induction operation, the rotor ring portion comprises a plurality of laminations which are internally slotted and have shorted electrical windings therein. More specifically, the rotor laminations are supported on the shaft by a bracket which is unitary with the rotor windings, forming a shorted secondary winding, mounting the rotor and securing the rotor laminations together.

And a further feature of the invention is that in a motor for synchronous operation the rotor includes magnet means having alternate north and south magnetic poles spaced around the periphery thereof.

Yet another feature of the invention is that in a motor for hysteresis operation, the rotor ring is of a magnetic material.

Further features and advantages of the invention will readily be apparent from the following specification and from the drawings, in which:

FIGURE 1 is a longitudinal section through an induction motor embodying the invention taken generally along line 1—1 of FIGURE 2;

FIGURE 2 is a transverse section taken generally along the line 2—2 of FIGURE 1;

FIGURE 7 is a reduced end view looking from the bottom of FIGURE 1;

Fractional horsepower motors of the type contemplated herein are used extensively in fans, kitchen appliances, record players, timers and the like. The improved constructions disclosed and claimed herein can be adapted for these and many other applications.

Figure 3:
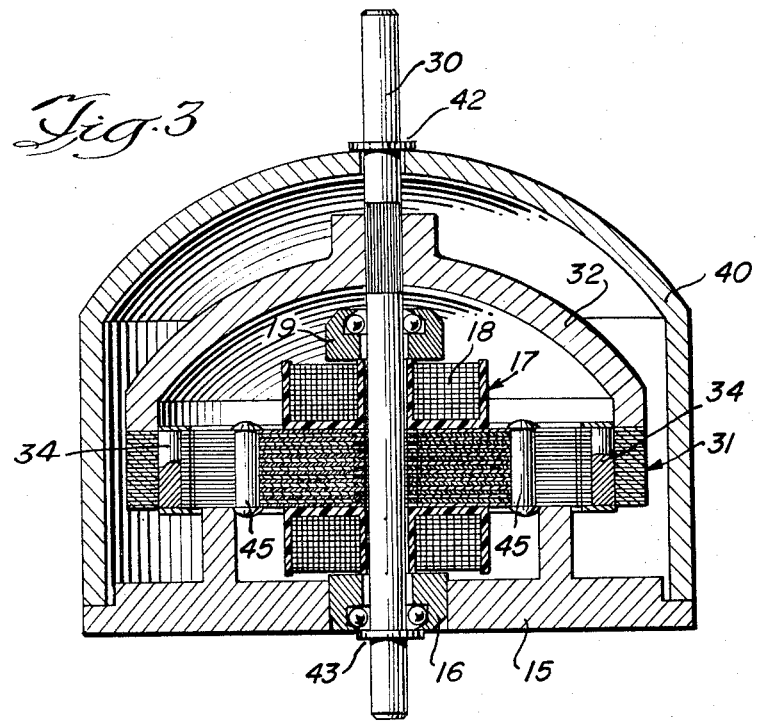
FIGURE 3 is a longitudinal section taken generally at right angles to FIGURE 1, along line 3—3 of FIGURE 2.

Turning now to the drawings and more specifically to FIGURES 1 through 3, the invention is illustrated as embodied in a single phase induction motor. The motor includes a base element 15, suitably formed as of a molded plastic material, with a shaft bearing 16 therein. Bearing 16 may, if desired, be molded directly in the base member or may be press fit into a hole therein.

Mounted on the base 15 is a bobbin 17 on which is wound stator coil 18. A second bearing 19 is mounted on, or may be molded with, bobbin 17. The stator further includes a pair of pole pieces 21 and 22 each of which has a leg portion 23, 24 which extends into the central opening 25 of the bobbin. The stator pole pieces also have pole portions 27 and 28 which extend outwardly from the leg portions and have an arcuate periphery, the pole portions forming opposed segments of a circle.

A shaft 30 extends through the center web 17a of bobbin 17, through the leg portions of the pole pieces and is supported for rotation by bearings 16 and 19. The rotor includes a ring portion 31, concentric with and surrounding the pole pieces 21 and 22 and lying in the same plane therewith. Ring portion 31 of the rotor is supported on shaft 30 by a cup-shaped bracket 32. Rotor ring portion 31 is provided with a plurality of slots 33 which receive windings 34 that are connected by end pieces 35 forming a shorted, squirrel cage rotor winding.

Shading coils 37 and 38 are provided on the outwardly extending pole portions and establish the direction of rotation of the rotor assembly. The ends of the shading coils are received in suitable notches in edges of the pole pieces.

A dust cover 40 surrounds the entire assembly. Slots 41 in base 15 provide for ventilation to avoid overheating. Snap rings 42 and 43 on shaft 30 outside cover 40 and base 15 prevent longitudinal movement of the shaft and rotor assembly.

Bobbin 17 is preferably molded of a suitable plastic material, as nylon, and has a central body portion 17b which defines a rectangular opening through the bobbin and on which the coil 18 is wound. Rectangular end pieces 17c provide support for the ends of the coil. The thickened center web 17a of the bobbin, through which motor shaft 30 passes, has elongated recesses therein to help control shrinkage during molding. The coil is wound in two generally equal portions, one on either side of web 17a.

Figure 4:
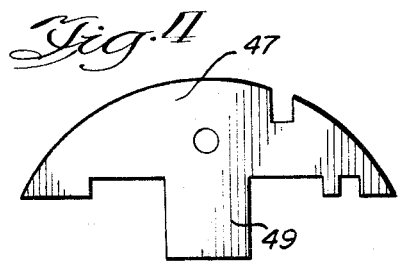
FIGURES 4 and 5 illustrate the two forms of stator laminations which are used.
Figure 5:
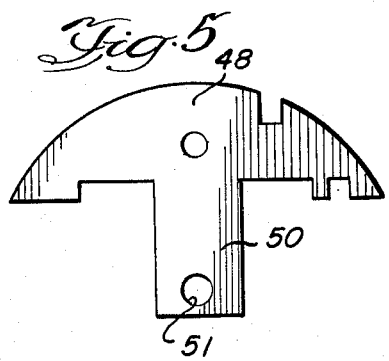
Figure 6:
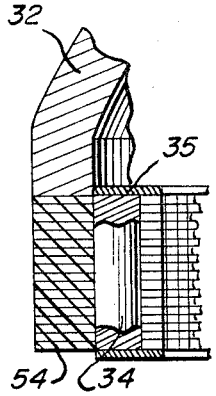
FIGURE 6 is an enlarged fragmentary detail of the rotor construction.

The stator pole pieces 21 and 22 each comprise a plurality of laminations secured together by suitable means, as rivets 45. As best seen in FIGURES 4 and 5, two lamainae 47 and 48 are provided. The leg portion 49 of lamina 47 is shorter than the leg portion 50 of lamina 48. The stack of laminations of each pole piece has alternate laminae 47, 48 and the laminae are arranged in the two pole pieces so that the ends of legs 23 and 24 may be interleaved. The holes 51 align to receive motor shaft 30. The interleaved construction permits ready assembly of the pole pieces to the coil and yet reduces any magnetic losses from an air gap between the two pole pieces.

The ring portion 31 of the rotor includes a plurality of laminations 54. The rotor laminations are secured together and the rotor windings are formed in the same operation. The laminations are stacked and the entire rotor winding including the winding portions 34 in the rotor slots 33 and the connecting rings 35 are formed in a single die casting operation. Any suitable conductive material may be used, as an aluminum alloy. At the same time, the cup-shaped bracket 32 is die cast as a part of one unitary structure. Such construction eliminates several assembly procedures which are necessary with other types of motor constructions and provides a sturdy reliable motor. The bracket and rotor ring assembly is mounted on shaft 30 which has a knurled section 30a providing a strong connection.

Figure 8:
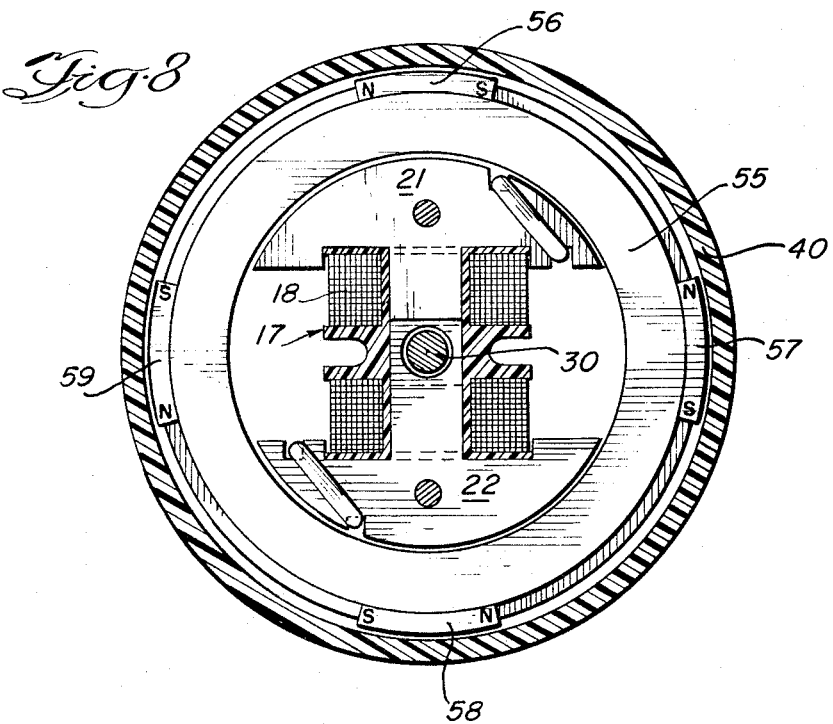
FIGURE 8 is a transverse section, similar to FIGURE 2, illustrating a synchronous motor embodying the invention.

The basic motor construction may be utilized with other types of motors. FIGURE 8 illustrates a synchronous motor having the same stator construction as the motor of FIGURES 1 through 3 but with a rotor having a solid ring portion 55 of magnetic material. Mounted on the periphery of the ring are a plurality of permanent magnets 56, 57, 58 and 59. These magnets are oriented so that alternate north and south poles are provided spaced peripherally of the rotor ring portion 55. The motor operates synchronously at a speed determined by the number of magnetic pole portions on the rotor and the exciting frequency for coil 18.

Figure 9:
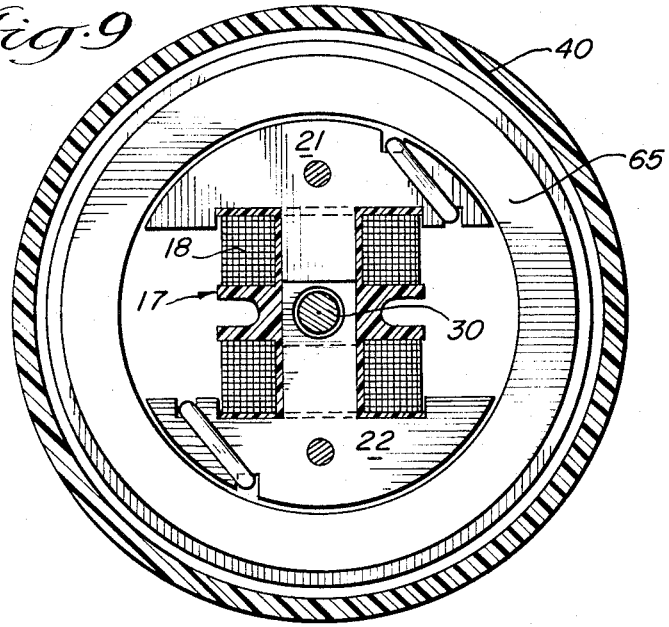
FIGURE 9 is a transverse section, similar to FIGURE 2, illustrating a hysteresis motor embodying the invention.

The basic motor construction is also usable in a hysteresis motor which is illustrated in FIGURE 9. Here, the rotor ring portion 65 is a solid member of a suitable conductive material, as a case hardened steel.

While I have shown and described certain embodiments of my invention, it is to be understood that it is capable of many modifications. Changes, therefore, in the construction and arrangement may be made without departing from the spirit and scope of the invention as disclosed in the appended claims.

I claim:
1. An AC motor, comprising: a bobbin having a central opening therethrough with a web thereon in a plane at right angles to the central opening; a coil wound on said bobbin, and having portions on either side of said central web; a pair of opposed stator pole pieces, each having a leg portion extending into the bobbin opening and a pole portion with an arcuate peripheral surface which form opposed segments of a circle; a rotor with a ring portion surrounding the pole portions of said stator pole pieces; and a shaft on which said rotor is mounted for rotation with respect to said stator, said shaft lying in the plane of the central web of the bobbin.

2. The motor of claim 1 wherein said shaft extends through the central web of the bobbin, with bearings on either side of the central web of the bobbin supporting the shaft.

3. An AC electric motor, comprising: a planar base having a bearing thereon; a stator bobbin on said base having a central portion for supporting a winding and with an opening through the central portion, and a transverse web on the central portion and lying in a plane at right angles to the axis of the opening, there being a hole through the web at right angles to the opening through the central portion, and aligned with said bearing; a second bearing on said bobbin and aligned with said hole and the first bearing; a stator coil wound on said bobbin with a portion on each side of said web; a pair of opposed stator pole pieces each having a leg portion extending into said bobbin opening and a pole portion with an arcuate periphery, said pole portions forming opposed portions of a circle; a rotor shaft supported in said bearings; a rotor ring surrounding said stator pole portions and concentric with the circle defined by the periphery of the stator; and bracket means supporting said rotor ring portion from said shaft and connected with said shaft at a point spaced outwardly from said second bearing.

References Cited
UNITED STATES PATENTS

| | | |
|---|---|---|
| 2,538,196 | 1/1951 | Hildebrand et al. _____ 310—67 |
| 2,767,339 | 10/1956 | Hatfield _____ 310—162 |
| 728,343 | 5/1903 | Wheeler _____ 310—269 |
| 1,077,179 | 10/1913 | Wilson _____ 310—46 |
| 1,838,150 | 12/1931 | Papst _____ 310—269 |
| 2,048,421 | 7/1936 | Ballentine _____ 310—201 |
| 2,427,947 | 9/1947 | Koch _____ 310—67 |

MILTON O. HIRSHFIELD, *Primary Examiner.*

L. L. SMITH, *Assistant Examiner.*